(12) United States Patent
Huang et al.

(10) Patent No.: US 7,657,897 B2
(45) Date of Patent: Feb. 2, 2010

(54) METHODS AND APPARATUS FOR COMMUNICATING BETWEEN MULTIPLE LEVELS OF SOFTWARE COMPONENTS

(75) Inventors: Zheng Huang, North York (CA); Efim Neiman, Aurora (CA); Jae Chong, Newmarket (CA); Velodymyr Stempen, Etobicoke (CA); Jeffrey Gongxian Cheng, Toronto (CA); Vladimir F. Giemborek, Richmond Hill (CA); Andrej Zdravkovic, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 752 days.

(21) Appl. No.: 11/121,545

(22) Filed: May 4, 2005

(65) Prior Publication Data
US 2007/0006199 A1     Jan. 4, 2007

(51) Int. Cl.
G06F 3/00          (2006.01)
G06F 13/00        (2006.01)

(52) U.S. Cl. ................... 719/321; 719/313; 719/328
(58) Field of Classification Search ............... 719/313, 719/320, 321, 323, 328; 710/5, 11; 717/168
See application file for complete search history.

(56) References Cited

U.S. PATENT DOCUMENTS

| 6,247,066 | B1* | 6/2001 | Tanaka | 719/320 |
| 7,027,972 | B1* | 4/2006 | Lee | 703/22 |
| 2005/0149948 | A1* | 7/2005 | Gupta et al. | 719/321 |
| 2005/0210233 | A1* | 9/2005 | Tang et al. | 713/100 |

* cited by examiner

Primary Examiner—Hyung S Sough
Assistant Examiner—Qing-Yuan Wu
(74) Attorney, Agent, or Firm—Vedder Price P.C.

(57) ABSTRACT

The present application discloses a method for communicating between at least two different levels of software components. The method includes establishing a command set common to the at least two different levels of software components. Additionally, the method includes providing a command decoder operable by both of the at least two levels of software components, the command decoder configured to decode the command set. By providing a common command set between different levels of software components, such as a software driver and a BIOS, where the commands within the command table are interpreted and executed by an identical command decoder that interprets and executes the same command tables, this ensures that the same features or functions are implemented or executed in the same way across different levels of the software components. Accordingly, redundant implementation of the same functions by different software components is eliminated. Additionally, when modification of the BIOS, for example, is performed, this modification only needs to be done in one place (i.e., the command table) rather than in each software component.

12 Claims, 7 Drawing Sheets

METHODS AND APPARATUS FOR COMMUNICATING BETWEEN MULTIPLE LEVELS OF SOFTWARE COMPONENTS

TECHNICAL FIELD

The present disclosure relates to methods and apparatus for communicating between multiple levels of software components and, in particular, a method and apparatus for providing a common command instruction set executable by different software components which run under different operating systems (OS) and different CPU modes using a common command decoder.

BACKGROUND

In computer systems, it is well known to include a basic input/output system (BIOS) programming code (i.e., software or firmware) executable by a processor, such as a central processing unit (CPU), to perform various operations and issue various commands. With conventional computer systems, such as those using "Legacy" BIOS, every software component run by a CPU implements commands or features in their own particular way, even though the features are the same. In other words, there is no centralization in the way each software component implements features to be performed, such as features to be performed by an application specific integrated circuit (ASIC) interfaced with the CPU; i.e., there is no relationship between the software components. Thus, if particular code sequences are wrong or have an error, each software component must change the sequence individually to make corrections, which requires maintenance work by the computer system and is prone to increased error. Moreover, such systems where each software component executes features independently are redundant and tend to utilize more system resources because the same functions are implemented by different software components.

Figure 1:
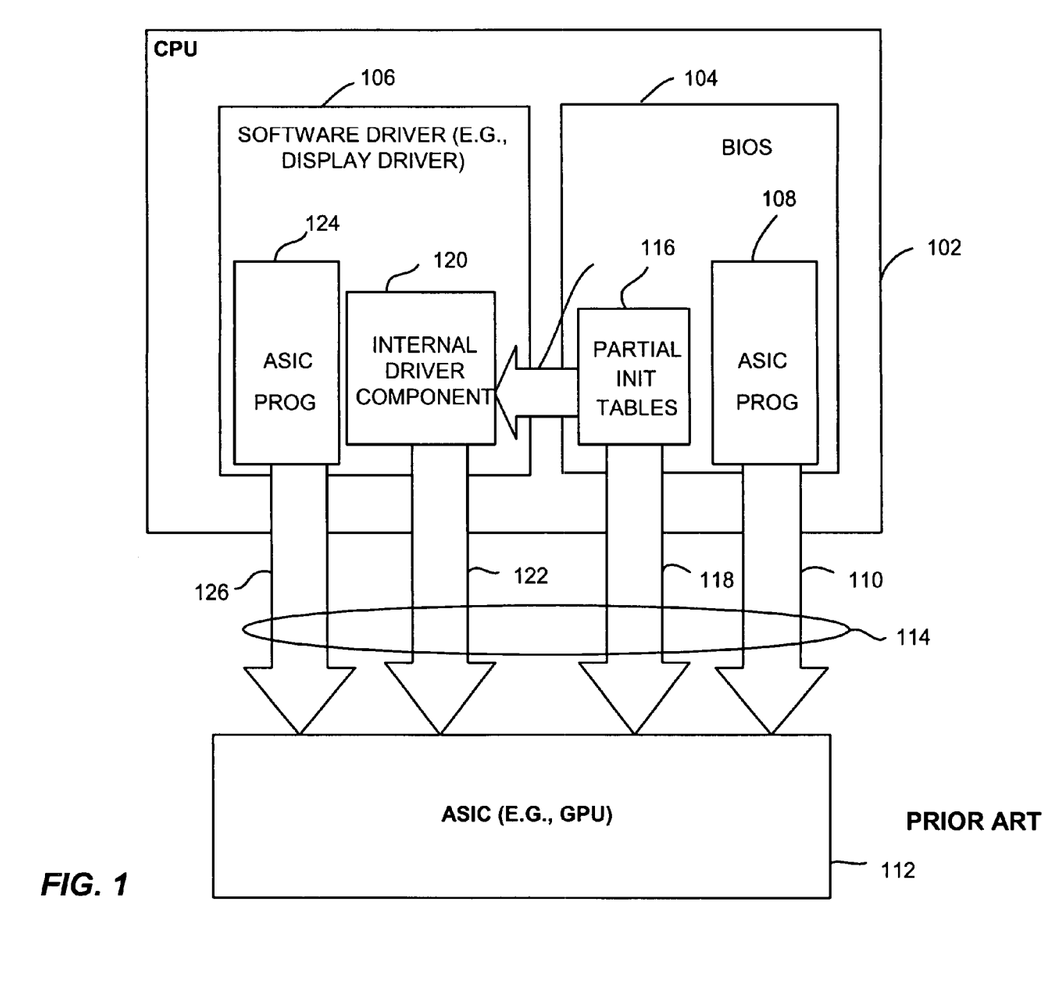
FIG. 1 illustrates a diagrammatic example of a conventional computer system utilizing independent software components for issuing commands and executing functions.

As an illustration of known conventional computer system, FIG. 1 illustrates a diagrammatic example of a "Legacy" BIOS system where a CPU 102 executes various software or firmware components such as BIOS 104 and a software program driver 106, such as a display driver issuing commands to a graphics processing ASIC 112 (e.g., a graphics processing unit (GPU)). As illustrated in this example, the BIOS 104 includes an ASIC program 108 that issues commands 110 to the ASIC 112 via an interface 114, such as PCI, PCI Express or AGP. Additionally, BIOS 104 includes partial initialization tables 116, from which commands 118 may be issued to ASIC 112 by the interface 114 independently of the ASIC program 108 run also in the BIOS 104. The partial initialization tables 116 also communicate with an internal driver component 120, which is software part of the software driver 106. This component 120 also issues commands 122 to the ASIC 112. The software driver 106 also includes software including an ASIC program 124 that also issues instructions and commands 126 to the ASIC 112 via the interface 114. It is noted that each of the software components (e.g., BIOS 104 and driver 106) have many functions in common, which leads to redundancy when commands are issued separately to the ASIC 112. Moreover, each of the portions of the software components, such as ASIC programs 108 and 124, the partial initialization tables 116 and the internal driver component 120 all require maintenance if a modification or an error needed to be fixed is encountered.

DETAILED DESCRIPTION

The present application discloses a method for communicating between at least two different levels of software components. The method includes establishing a command set common to the at least two different levels of software components. Additionally, the method includes providing a command decoder operable by both of the at least two levels of software components, the command decoder configured to decode the command set. By providing a common command set between different levels of software components, such as a software driver and a BIOS, where the commands within the command table are interpreted and executed by an identical command decoder that interprets and executes the same command tables, this ensures that the same features or functions are implemented or executed in the same way across different levels of the software components. Accordingly, redundant implementation of the same functions by different software components is eliminated. Additionally, when modification of the BIOS, for example, is performed, this modification only needs to be done in one place (i.e., the command table) rather than in each software component.

The application further discloses a storage medium, such as a memory, that stores instructions that, when executed by at least one processor in a computer system, causes the processor to execute the methodology discussed above.

Figure 2:
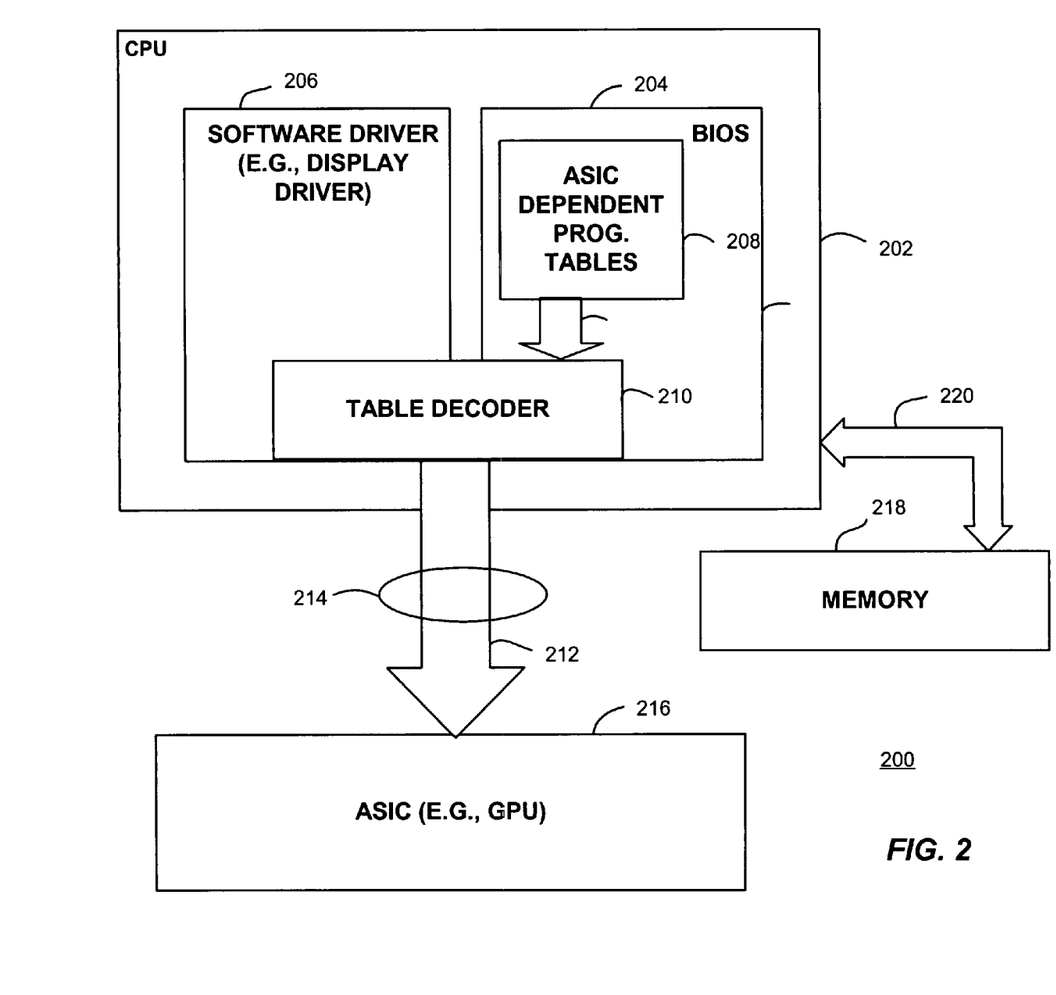
FIG. 2 illustrates an example of a computer system according to the present disclosure.

FIG. 2 illustrates an exemplary diagram showing a computer system 200 having a CPU 202 operable to execute various software components. The example of FIG. 2 illustrates at least two different software components: a BIOS 204 and a software driver 206, such as a display driver. The BIOS includes programming tables 208, which may be ASIC dependent. Additionally, the system 200 includes a table decoder 210 that decodes or parses commands issued either from the BIOS 204 or from the software driver 206. The table decoder 210 is either software or firmware executable by both the BIOS 204 and any other software such as driver 206 or any other software executable by the computer operating system. The table decoder 210, whether executed in the driver 206 or BIOS 204, issues a common set of commands for hardware programming sequences to an ASIC, for example. The commands 212 are sent via an interface 214 to the particular ASIC 216 as illustrated in FIG. 2. Examples of the types of hardware programming sequences issued from the table decoder 210 to the ASIC 216 may include, but are not limited to, register read/write, timing control, arithmetic logic, and flow-control logic.

FIG. 2 also illustrates a memory 218 that may include a random access (RAM) or a read only (ROM) type memory. The memory 218 is shown interfaced to the CPU 202 via interface 220. It is noted that the interface 220 is merely shown for illustrative purposes as an arrow, but is not intended to be limiting that the memory 218 is specifically interfaced to the CPU 202 as shown, but may be interfaced through a host bridge device or any other suitable hardware known in computing systems. The memory 218 is configured to include the software or constitute firmware that is executable by the processor 202. The specific ASIC dependent programming tables 209 and the table decoder 210 are stored in the memory 218 and executed by the CPU 202 or any other suitable processor.

Figure 3:
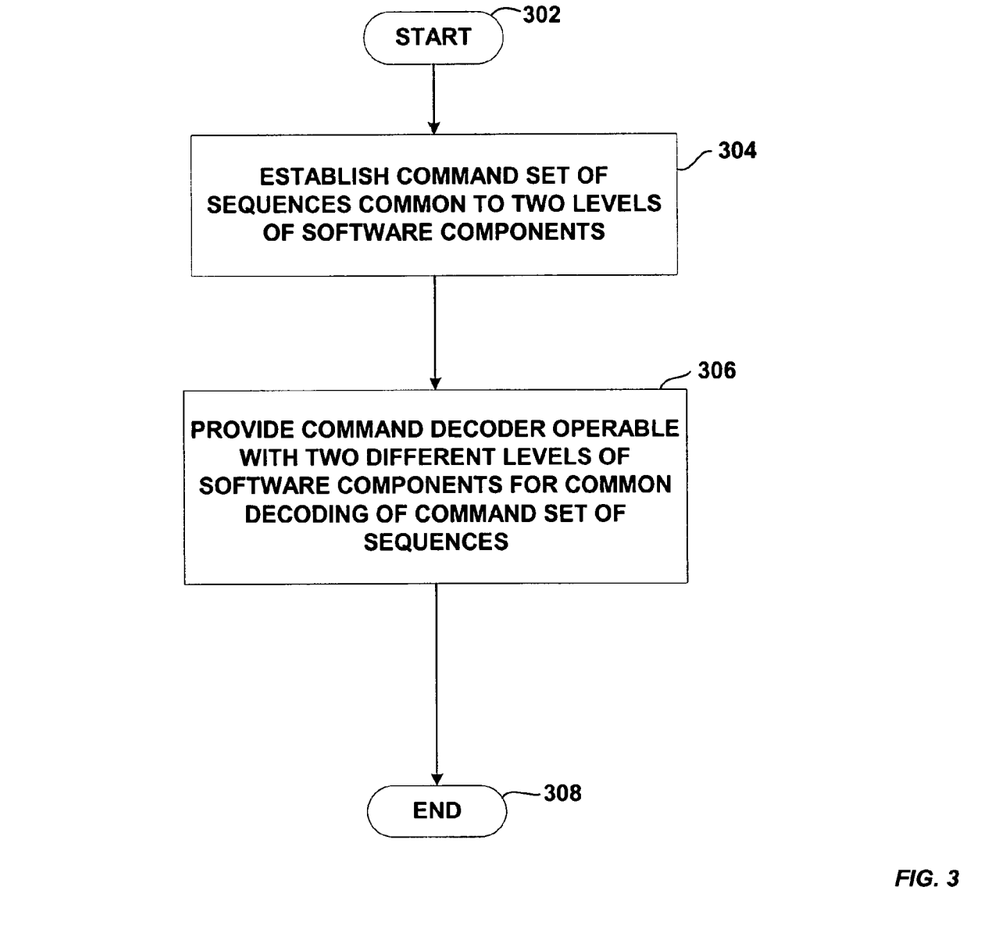
FIG. 3 illustrates a flow diagram of a method for providing a common BIOS system in a computer system.

FIG. 3 illustrates an exemplary method according to the present disclosure by which communication is effected across different levels of software components. The process 300 begins at a start block 302 and proceeds to block 304. At block 304 a command set, namely the ASIC dependent programming tables 208, are established by execution with the processor 202 where the command set is common to at least two different levels of software components. Specifically, the tables 208 include a command set that are capable of describing most common operations for a particular ASIC. This command set may be accessed through a user interface that allows a user to edit the tables without an understanding of low-level command instructions, such as machine code or assembly language. This makes modification of the BIOS, such as BIOS 204, much simpler for users. As examples, the command set may include a natural language type set of instructions that are accessible through the user interface. Specific types of commands or instructions may include, but are not limited to, functions such as PLL (phase lock loop) programming, memory initialization and reset, dynamic clocking, optimizing power usage, enable/disable of different display devices, extended mode set sequences, CRT/TV impedance load detection, initialization of registers within an ASIC, DPM sequencing for each display device, spread spectrum enable/disable sequences, static ASIC power transition sequences, and DDC/EDID detection for each display device.

Referring again to FIG. 3, the flow proceeds from block 304 to 306 where provision of a command decoder operable with the at least two different levels of software components is provided. The provision of the command decoder, such as command decoder 210, allows or affords common decoding of the command set of sequences established in the tables 208. As mentioned previously, the command decoder is software implementable across various levels of software, such as in the BIOS 204 and by the higher level operating system, which runs software driver 206, for example. By providing identical software for the command decoder, which is implementable across different software components, interpretation and execution of the same commands in the command table ensure that the same features or functions are implemented or executed in the same way. Flow then proceeds to block 308 where the method ends.

Figure 4:
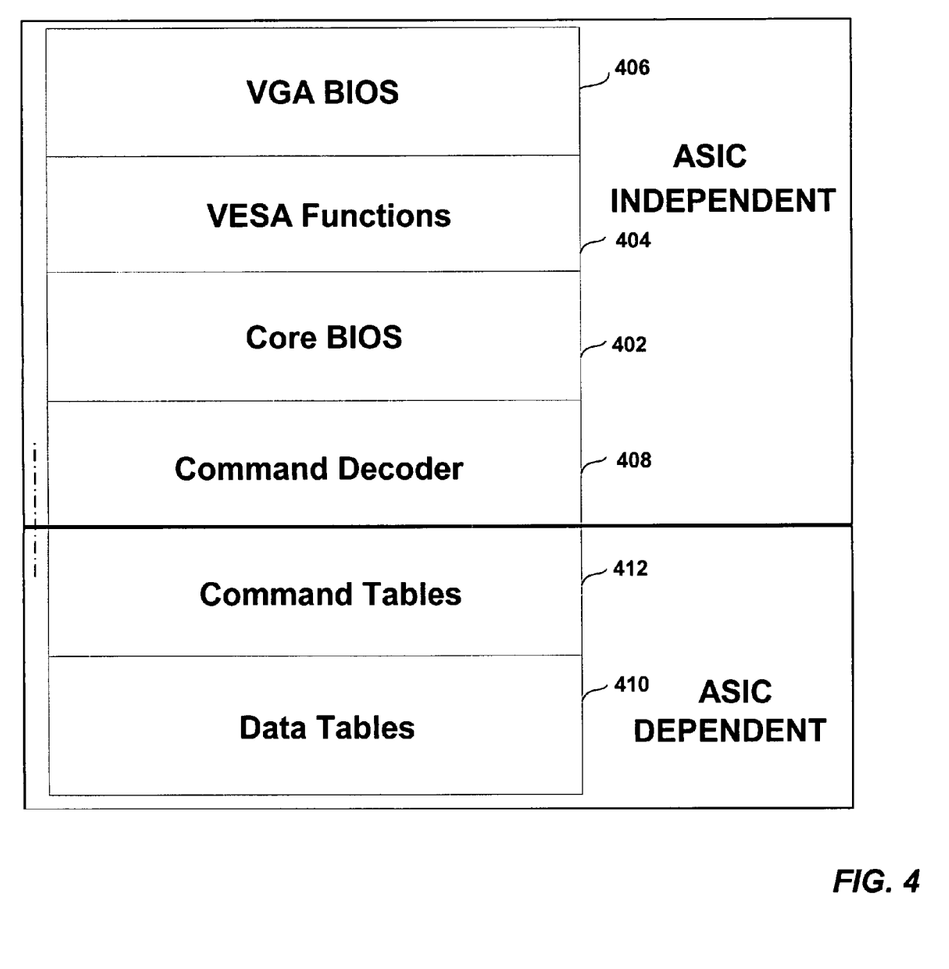
FIG. 4 illustrates functional blocks of a BIOS software according to the present application.

FIG. 4 illustrates functional blocks of an exemplary BIOS. In particular, the example of FIG. 4 illustrates software components with a video BIOS. As illustrated, the BIOS includes a core BIOS 402 that is used to overall control the BIOS components. Additionally, the BIOS may include VESA functions 404, which are functions established by the Video Electronic Standard Association (VESA). A further component includes a specific video graphics adapter (VGA) BIOS 406. It is noted that each of these components 402, 404, and 406 are independent of whatever particular ASIC is interfaced with the central processing unit (CPU).

Further, the BIOS according to the present disclosure also includes a command decoder 408 that, as discussed previously, is common to BIOS run on the CPU, as well as other drivers that may be loaded from memory and run on the CPU. This command decoder 408 is also independent of any particular ASIC being interfaced with the CPU.

The BIOS also includes a couple of components that are dependent on the particular ASIC interface with the CPU. In particular, the BIOS includes data tables that may include hardware specific information data; namely the hover being an ASIC interfaced with the CPU. Furthermore, the other ASIC dependent component includes the command tables, which were discussed previously. The command tables include a particular set of commands that are viable to customize for a particular hardware (i.e., a particular ASIC). The use of the command tables 412 affords centralized, ASIC dependent hardware specific programming for all software components. Thus, it is easy to update the command and data tables (410 and 412) affording quick turnaround time for test BIOS used by internal engineering teams and external customers.

Figure 5:
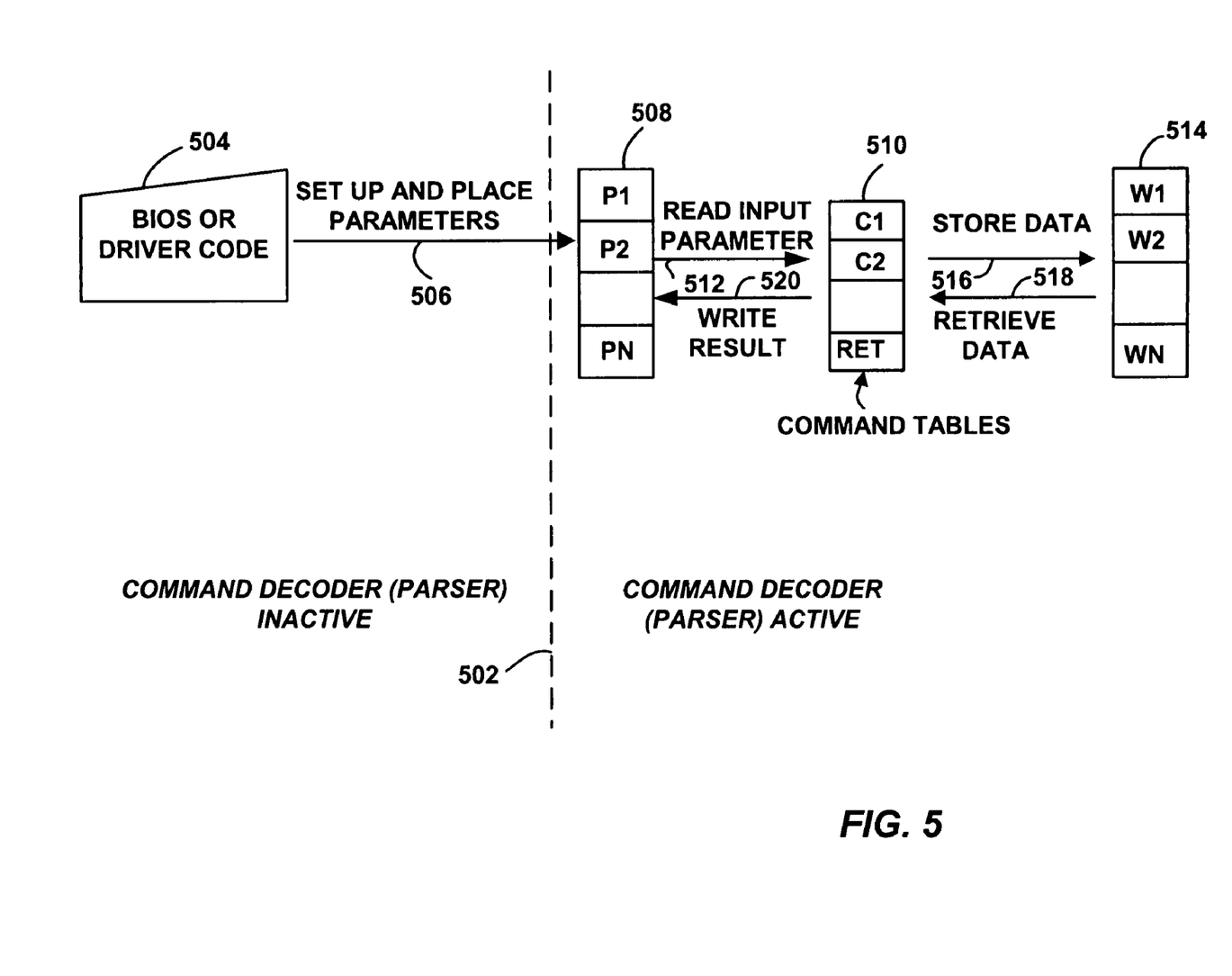
FIG. 5 illustrates an example of a diagrammatic representation of process of a command table.

FIG. 5 is an example of a diagrammatic representation of the process performed when the command table is used to decode or interpret input parameters during execution. As illustrated, FIG. 5 shows a dashed line 502 indicating the temporal sequence of the process. That is, on the left side of line 502, the operation illustrated occurs when the command decoder is inactive. In contrast, the pictorial representation on the right side of line 502 indicates a time period when the command decoder is active. During periods when the command decoder is inactive, either the BIOS or driver software code 504 decides or calculates input parameters 506, which are set up and placed in a parameter space 508 before execution by the command decoder.

Once the command decoder is active, the input parameters P1, P2, ... PN and are read from the parameter space (PS) 508 to the command tables 510 as illustrated by arrow 512. Once the input parameters are read from parameter space 508, the command decoder interprets or parses the parameters to insure the correct command is called. It is noted that the language of the command set is utilized for this process. If data is created as a result of the command execution this may be stored in a work space (WS) 514 as indicated by arrow 516. The data may be used for temporary storage and also may be used for additional calculations in the workspace 514. If data needs to be retrieved based on execution of commands in the command table 510, this data is retrieved from the workspace 514 by the command decoder into the command table 510 as illustrated in FIG. 5 by arrow 518. Additionally, if the BIOS or driver requires status and/or results of the command table execution, results may be written back to the parameter space 508 as indicated by arrow 520, which in turn may be accessed by either the BIOS or driver code 504.

It is noted that the parameter space (PS) and workspace (WS) may be implemented using a frame buffer or any other suitable type memory. Furthermore, the parameter space command tables and workspace are functionally part of the command decoder, which was discussed previously.

Figure 6:
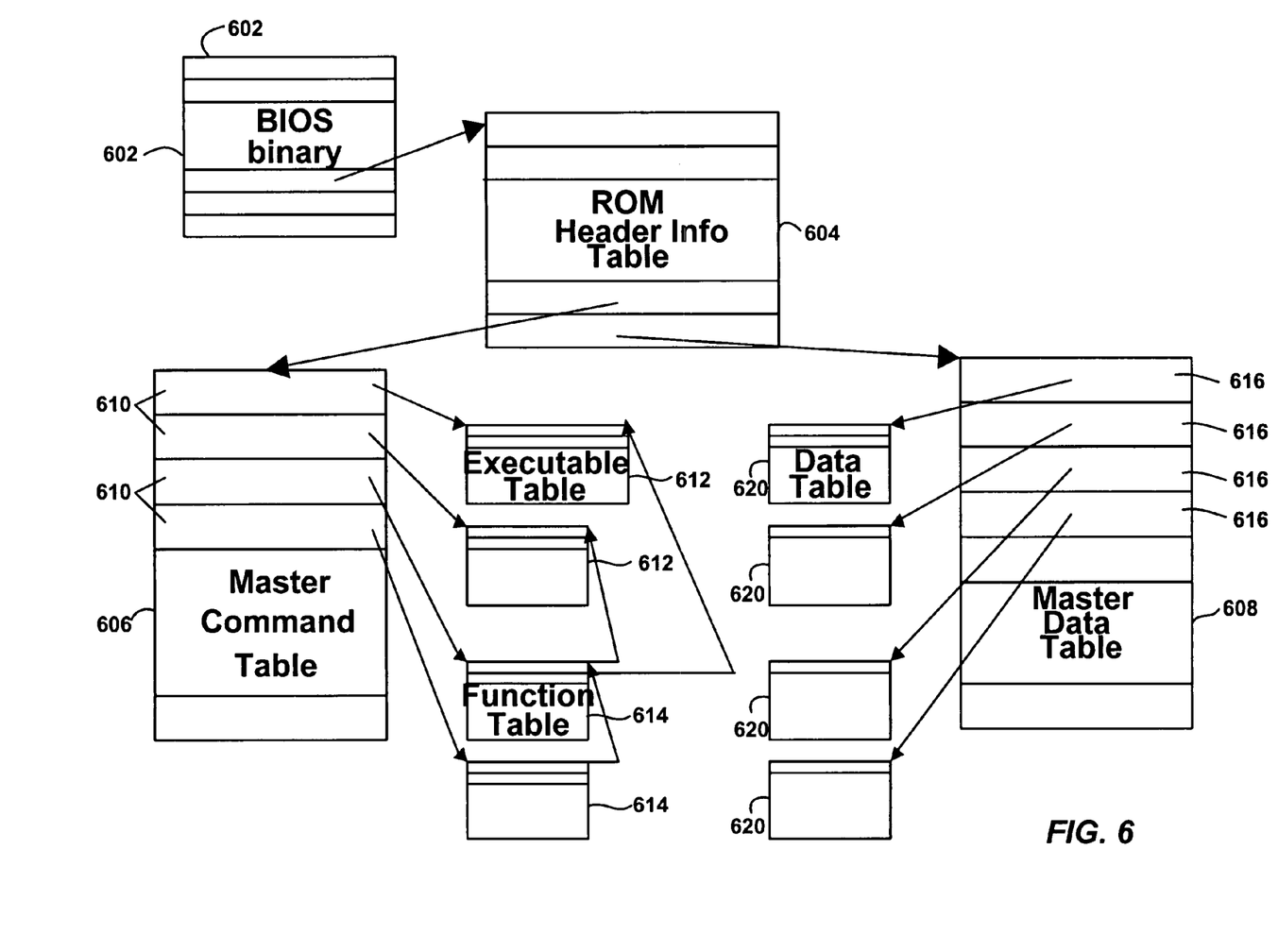
FIG. 6 illustrates an exemplary organization of command tables according to the present disclosure.

FIG. 6 illustrates an exemplary structure for the BIOS binary code 602 where the command tables within the code are structured in a particular fashion. As illustrated, the BIOS binary includes a ROM header information table 604. This particular table contains the master command table 606 and master data table 608. Within the master command table 606 are lists of pointers 610 that point to executable tables and function tables 612 and 614, respectively. The function tables 612 consist of executable tables that perform various functions and are configured to call the basic executable tables when performing simpler tasks. The executable tables 614 are hardware specific and contain programming for simple tasks specific to a particular hardware (e.g., an ASIC). Because the master command table 606 contain pointers to both the basic executable tables 614 and the function tables 612, the basic executable tasks in tables 614 may be directly called from the master command table 606 without first calling a function from the function tables 612.

Additionally, the master data table 608 contains a list of particular pointers 616 that point to respective data tables 620. Each of the data tables consists of hardware specific information data that is used for LVDS information, TMDS information, DAC information, as examples. The program information data may used within the command table. Additionally, the program data information is used by the native code language (e.g., C+, assembler, etc).

It is noted that the instructions on the basic executable table 614 may be used in different ways and thus affords flexibility by allowing the function tables to utilize these basic executable instructions in various ways. Furthermore, the ROM header information table 604 is a reference table to particular destinations, such as the master command table 606 or the master data table 608. Thus, table 604 is only an index and not a command table and is stored at a fixed location within the BIOS image.

Figure 7:
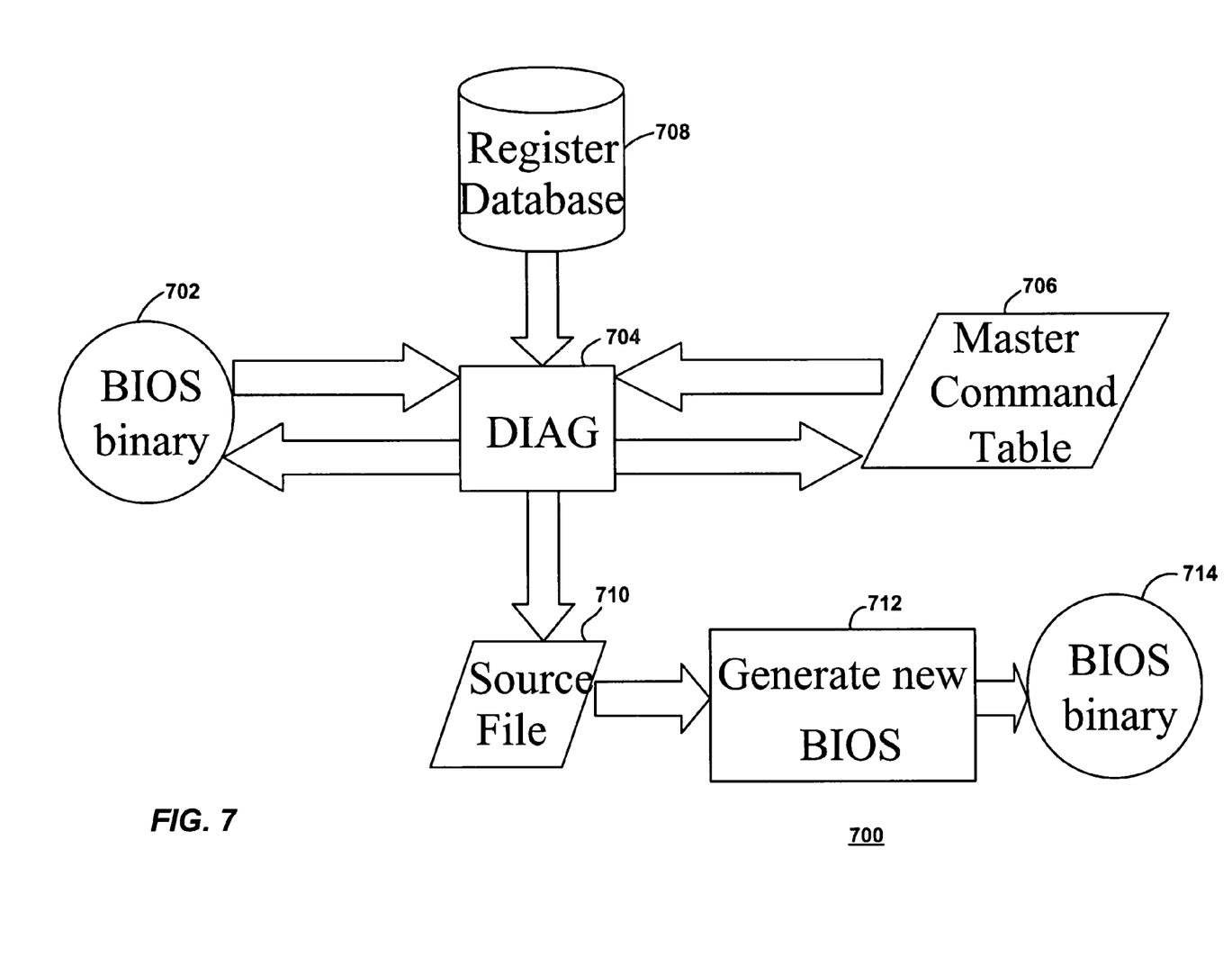
FIG. 7 illustrates a functional block diagram of a procedure and system for updating BIOS according to the present disclosure.

FIG. 7 illustrates a system and process by which different BIOS for different ASICs may be customized prior to delivery to an end customer. The system 700 includes a custom delivered BIOS binary 702, which is typically particular to a specific hardware, such as an ASIC. A diagnostic system 704, which is code part of the BIOS, and is the user interface allowing a designer to view, modify and debug the command table 706. A registered database 708 is further and accessible by the diagnostic user interface 704 in order to access stored BIOS binaries such as for comparison of the provided BIOS binary 702 and previous BIOS binary.

After various modifications have been made to the BIOS binary provided by the diagnostic user interface 704, the resultant BIOS is written to a source file 710. It is noted that in one example, the BIOS may be sent to the source file 710 in a text format. Additionally, the modified BIOS may then be used to generate a new BIOS yielding the resultant BIOS binary 714. This BIOS binary 714 may then also be stored in the registered database 708 for utilization and the creation of further customized BIOS binaries.

The above-detailed described of the examples has been presented for the purposes of illustration and description only and not by limitation. It is therefore contemplated that the present application cover any additional modifications, variations, or equivalence that fall within the spirit and scope of the basic underlying principles disclosed above and the appended claims.

What is claimed is:

1. A method of facilitating communication between at least two different levels of software components that are executed by at least one processor, the method comprising:
    decoding a set of hardware programming commands common to the at least two different levels of software components using a command decoder that is operable within both of the at least two levels of software components; and
    issuing a hardware programming command of the set of common hardware programming commands from the at least two different levels of software components through the command decoder to an application specific integrated circuit, wherein one of the at least two different levels of software components includes a system BIOS and another of the at least two different levels of software components includes software executed by a processor.

2. The method as defined in claim 1 further comprising:
    providing a command table within at least one of the levels of software components, the command table configured to be modifiable through a user interface.

3. The method as defined in claim 2, wherein the command table is configured to be accessible for programming of command sequences through the user interface.

4. The method as defined in claim 2, wherein the command table is stored in memory as binary code without compilation.

5. The method as defined in claim 2, wherein the command table includes the command set.

6. A storage medium comprising executable instructions such that when processed by a processor causes at least one processor to:
    decode a set of hardware programming commands common to the at least two different levels of software components using a command decoder that is operable within both of the at least two levels of software components; and
    issue hardware programming command of the set of common hardware programming commands from the at least two different levels of software components through the command decoder to an application specific integrated circuit, wherein one of the at least two different levels of software components includes a system BIOS and another of the at least two different levels of software components includes software executed by a processor.

7. The storage medium as defined in claim 6 wherein the executable instructions further cause the at least one processor to provide a command table within at least one of the levels of software components, the command table configured to be modifiable through a user interface.

8. The storage medium as defined in claim 7, wherein the command table is configured to be accessible for programming of command sequences through the user interface.

9. The storage medium as defined in claim 7, wherein the command table is stored in memory as binary code without compilation.

10. The storage medium as defined in claim 7, wherein the command table includes the command set.

11. An apparatus, comprising:
    a processor that is operative to:
        provide at least one first hardware programming command in response to executing a first software component;
        provide at least one second hardware programming command in response to executing a second software component, wherein the second software component comprises a display driver and the first software component comprises a system BIOS; and
        provide at least one common hardware programming command to an application specific integrated circuit in response to executing a table decoder and receiving at least one of: the at least one first hardware command and the at least one second hardware command.

12. The apparatus of claim 11 wherein the application specific integrated circuit comprises a graphics processing unit that is operative to interpret the at least one common hardware programming command.

* * * * *

UNITED STATES PATENT AND TRADEMARK OFFICE
CERTIFICATE OF CORRECTION

PATENT NO. : 7,657,897 B2  Page 1 of 1
APPLICATION NO. : 11/121545
DATED : February 2, 2010
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Eighteenth Day of January, 2011

David J. Kappos
*Director of the United States Patent and Trademark Office*